Sept. 8, 1953     S. L. BERGEY ET AL     2,651,721
ANTENNA APPARATUS
Original Filed March 22, 1946     3 Sheets-Sheet 1

INVENTORS
STANLEY L. BERGEY
JAMES A. NOTTINGHAM
BY
Herbert **. Thompson
ATTORNEY

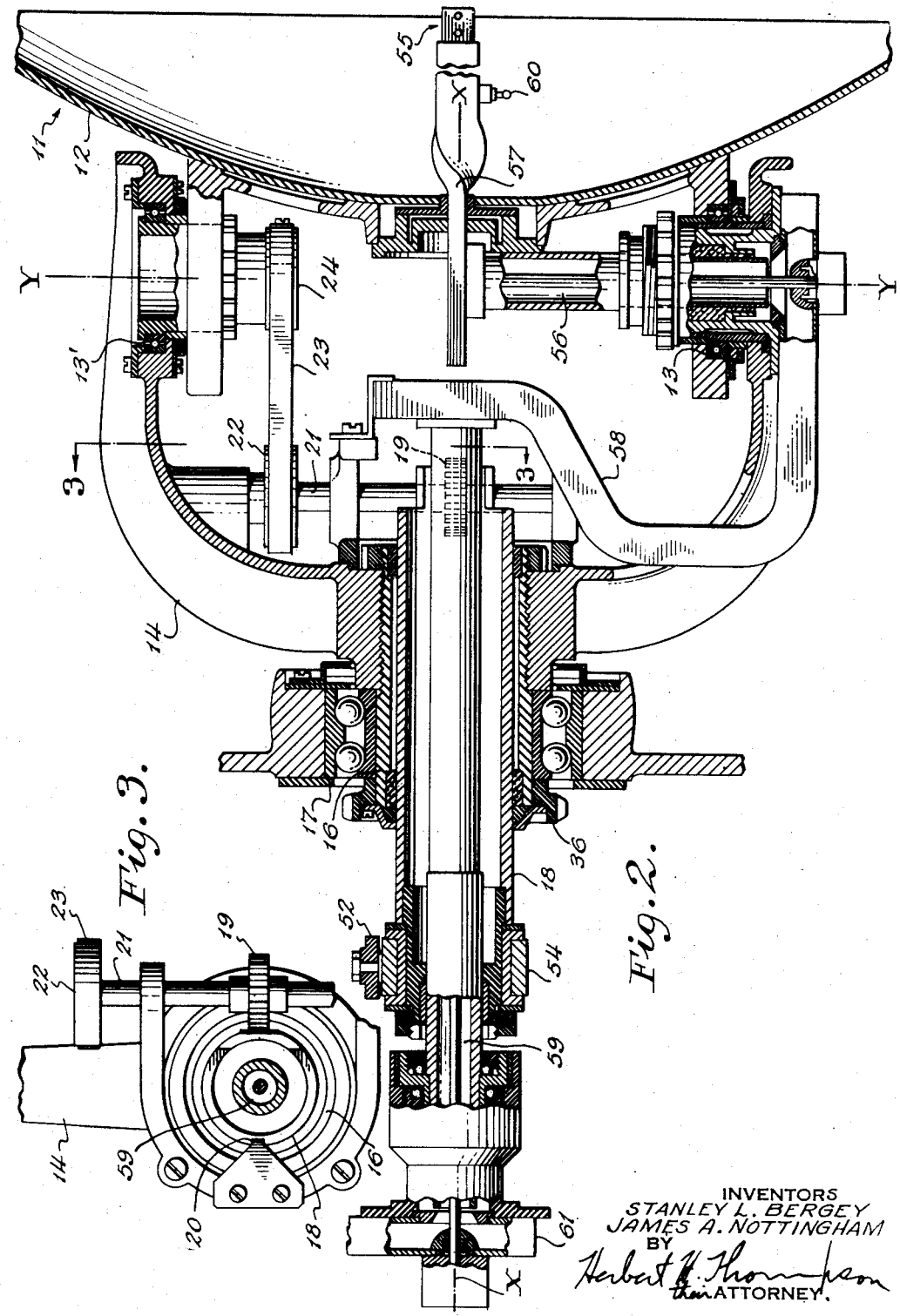

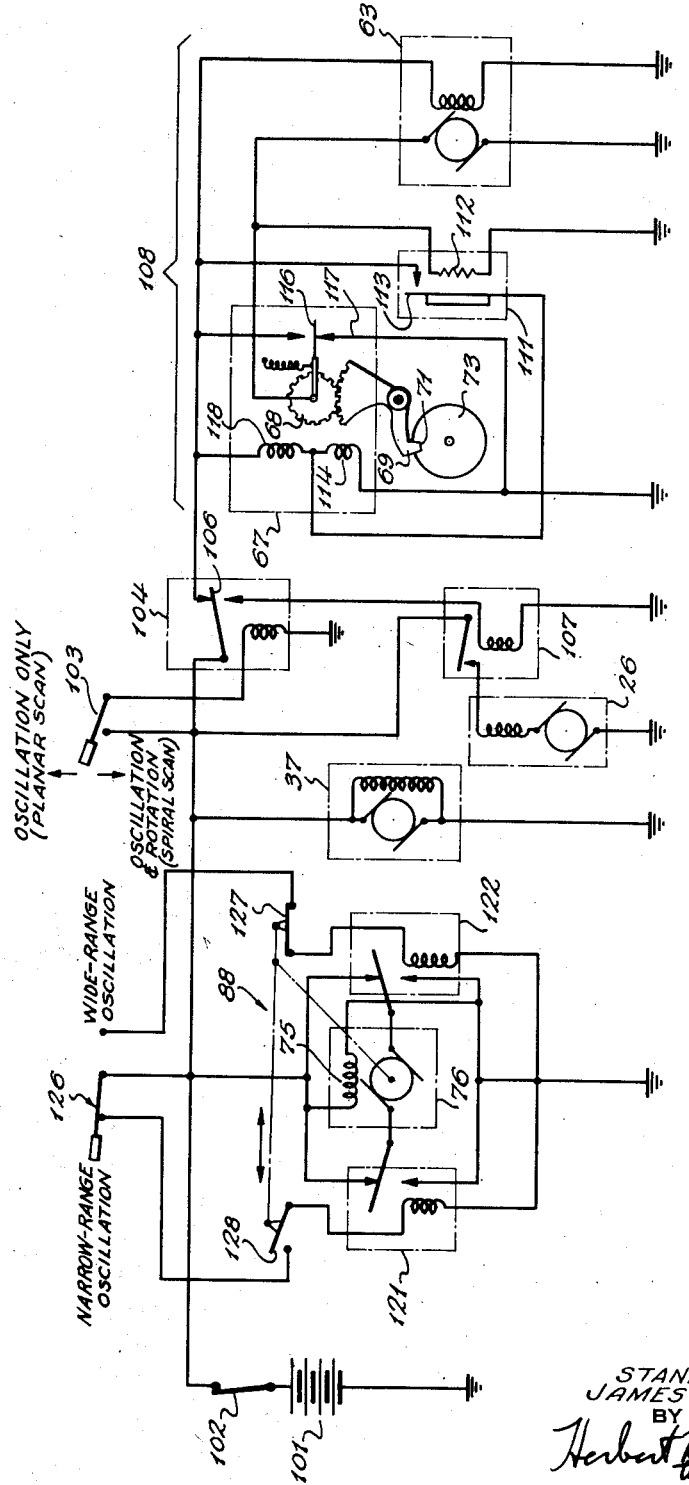

Patented Sept. 8, 1953

2,651,721

UNITED STATES PATENT OFFICE 2,651,721

ANTENNA APPARATUS

Stanley L. Bergey, Hempstead, and James A. Nottingham, Hicksville, N. Y., assignors to The Sperry Corporation, a corporation of Delaware Original application March 22, 1946, Serial No. 656,226, now Patent No. 2,544,648, dated March 13, 1951. Divided and this application December 19, 1950, Serial No. 201,584

8 Claims. (Cl. 250—33.65)

The present invention relates to directive antenna scanning systems and more particularly to scanning systems suitable for regular scanning through any of several scanning patterns.

More particularly, the present application is a division of our copending application Serial No. 656,226, filed March 22, 1946, now Patent No. 2,544,648 granted March 13, 1951 for Antenna Apparatus.

Directive antenna scanning systems have been employed in various types of radio navigation systems, and in radar systems employed for determination of remote object directions and distances. Usually, the directive antenna system is provided with a motor-driving unit adapted to cause the directive axis of the antenna to be moved through a predetermined range of movement at a regular rate, the type and range of movement being fixed according to the type of service for which the system is intended.

Radar systems having been provided in diverse forms for different tactical purposes. One example is a radar system for enabling one aircraft to intercept another aircraft and to direct its fire toward the intercepted craft. Another example is a radar system arranged to enable one craft such as an airplane, for example, to search for a vessel upon the ocean and to direct explosive charges toward the vessel. A radar system for the former purpose employs variable angle conical scanning, referred to as "spiral" scanning, wherein the directive antenna is rotated about the longitudinal axis of the craft at a first speed, and the angle between the antenna axis and a direction substantially parallel with the longitudinal axis of the craft is regularly varied between zero and a predetermined maximum angular divergence. By observing the variations of the strength of reflected signals in relation to the variation of the antenna direction, the pilot of the interceptor aircraft may operate the craft in such a way as to aim the longitudinal axis of the craft toward the intercepted airplane, and thus to direct fixedly mounted and forwardly aimed guns in the interceptor craft toward the intercepted airplane. A scanning system of this general type is described in detail and claimed in U. S. Patent 2,407,305 to Langstroth et al., issued September 10, 1946 and assigned to the assignee of the present invention.

The type of radar system which has been provided for enabling a craft operator to find a vessel on the surface of the ocean and to direct explosive charges theretoward, on the other hand, is arranged for regular oscillatory scanning of the antenna directive axis through a substantially horizontal and substantially planar range of movement.

In view of the different individual types of directive antenna scanning systems heretofore available, if a single aircraft were required to be equipped both for enemy aircraft interception and for finding and attacking sea-borne craft, it would be necessary to provide the aircraft with two complete radar systems, or at the least with two complete directive antenna scanning systems for use in conjunction with interchangeable transmitter and receiver units, since neither of the above types of radar antenna scanning systems is well suited to serve the purposes of the other. However, it is essential to the most effective employment of aircraft that the size and weight of the radio equipment carried thereby be kept to a minimum, in order that the aircraft be enabled to carry sufficient armament, ammunition, and fuel for maximum effectiveness over a large radius of operation.

An object of the present invention is to provide an improved directive antenna scanning system of great flexibility of application.

More specifically, it is an object of the present invention to provide without sacrifice of ruggedness and simplicity and reliability a directive antenna scanning system suited for a variety of regular scanning patterns selectable at the will of the operator.

Another object of the present invention is to provide a directive antenna scanning system suited for a variety of regular scanning patterns selectable at the will of the operator, and to arrange the directive antenna scanning system for maintenance of optimum scanning speed consistent with the pattern and mode of operation.

It is a further object to provide an improved directive antenna scanning system wherein the antenna directive axis may be oscillated about a transverse axis, which axis of oscillation either may be regularly rotated about a further axis concurrently with the oscillation, or may be fixed in a predetermined orientation for substantially planar scanning of the directive axis.

Yet another object is to provide a directive antenna scanning system wherein the antenna directive axis may be regularly oscillated through a variable angular extent at the maximum speed of oscillation consistent with reliable performance of the system.

These objectives have been met in the present invention by the provision of a directive antenna pivotally mounted for oscillation about an axis transverse the directive axis of the antenna, through a range of oscillation with which is co-ordinated the oscillatory period, the speed of oscillation and range thereof being made simultaneously variable under the control of the operator. Mechanism is provided for rapidly rotating the antenna and the pivotal mounting therefor about an axis of rotation transverse the axis of oscillation, or for selectively arresting the rotation and fixing the axis of oscillation in a predetermined orientation, e. g., in a substantially vertical orientation so that the antenna directive axis is swept through a substantially planar and substantially horizontal range of directions. The oscillation of the antenna is effected through reciprocal relative translation of a tubular sleeve and a member extending therethrough, and the rotation of the antenna is accomplished by rotation of the tubular sleeve in a bearing aligned with the longitudinal axis of the craft. The angular extent and the period of the oscillation are coordinately controlled by varying the ratio of lever arms in a reciprocating linkage employed to produce the reciprocal translation between the tubular sleeve and the member extending therethrough, and by simultaneously shifting the setting of a variable speed coupling through which the linkage is driven by a motor. The member extending through the tubular sleeve is itself made hollow, to permit the efficient transfer of high-frequency radio energy therethrough.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features of the present invention will be better understood, and further objects will become apparent, from the following description of a preferred embodiment of the present invention, illustrated in the drawings, wherein:

Figs. 2 and 3 are longitudinal and cross-sectional views, respectively, showing constructional details of the main scanner assembly of the embodiment illustrated in Fig. 1; and Fig. 4 is an electrical schematic diagram showing the control circuits associated with the elements in Fig. 1.

Like reference characters are used throughout the drawings to designate similar portions thereof.

Figure 1:
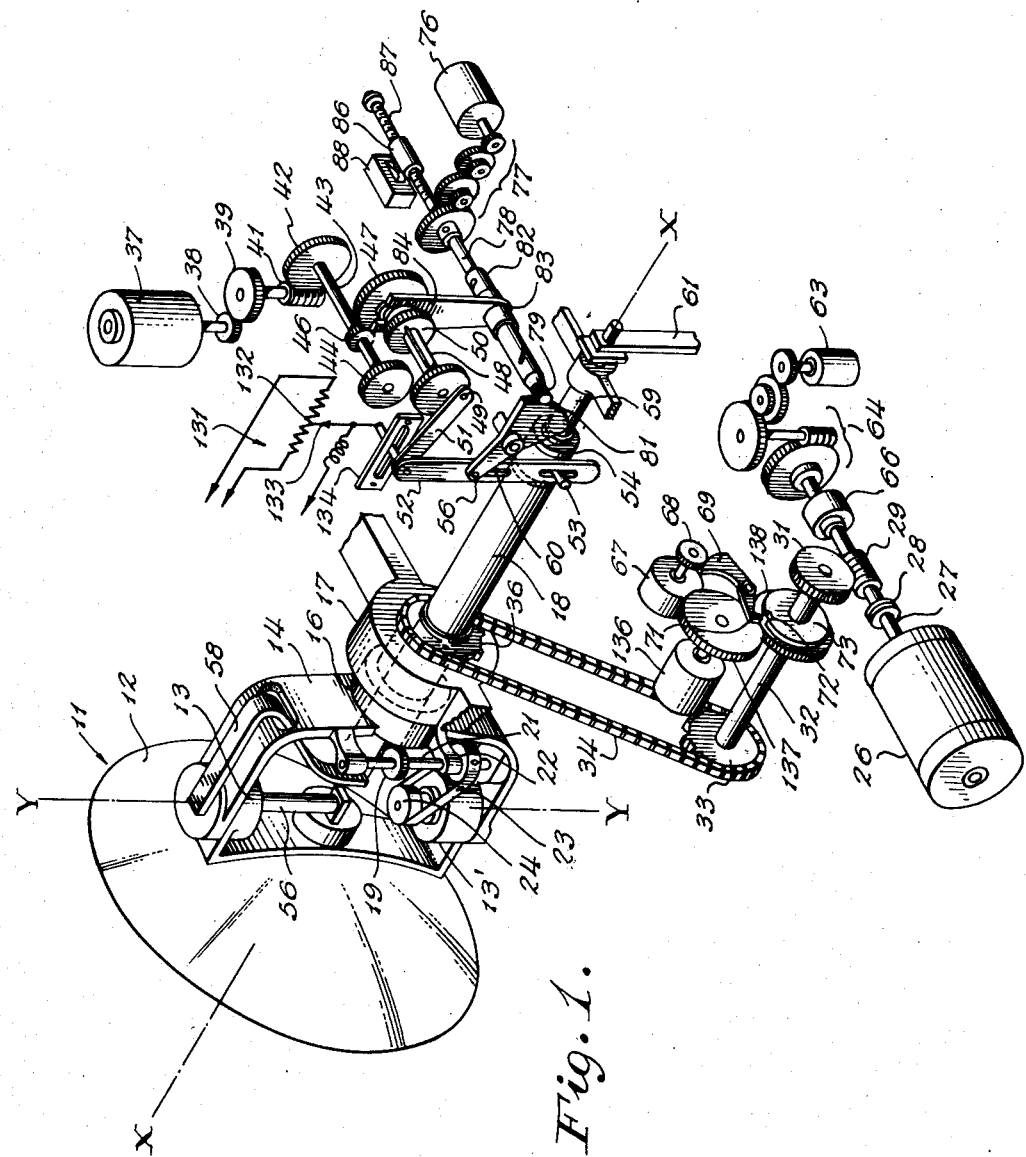
Fig. 1 is a schematic representation of the mechanical elements of an embodiment of the present invention.

In Figs. 1 and 2 there is shown a directive antenna 11 illustrated as comprising a paraboloidal reflector 12. The antenna 11 is pivotally supported in bearings 13, 13' for oscillation therein about an axis Y—Y transverse the axis of the paraboloid 12, which latter coincides substantially with the axis of directivity of antenna 11. Bearings 13 and 13' are supported within a yoke 14 rigidly connected to an outer sleeve 16, which in turn is supported within a bearing 17 for rotation about axis X—X, the axis of sleeve 16.

An inner member 18, which may itself be tubular in form, is slideably arranged within the outer tubular sleeve or member 16 for rotation therewith but for relative translation with respect thereto along the axis X—X. In order to prevent relative rotation between the outer sleeve 16 and the inner member 18, a key 20 (Fig. 3) rigidly connected to the yoke 14 is arranged to cooperate with an elongated slot or groove along the outer surface of inner member 18 parallel with the axis thereof. A rack formed in the end of the inner member 18 extending within yoke 14 is arranged to mesh with a spur gear 19 (Figs. 1, 2 and 3) which in turn is coupled through a shaft 21, a pulley 22 and a belt 23 to a pulley 24 rigidly fastened to antenna 11 and coaxial with the Y—Y axis bearings 13 and 13'. Through this chain of elements, reciprocal translation of the inner member 18 is enabled to produce and accurately control oscillatory movement of the antenna 11 about the axis Y—Y. If preferred, a pair of meshed sector spur gears of equal pitch diameters, one on shaft 21 and the other on antenna 11, may be used instead of pulleys 22 and 24 and belt 23.

A motor 26 (Fig. 1) coupled through a shaft 27, a flexible coupler 28, a worm 29 and worm gear 31, a shaft 32, and a sprocket 33 and chain 34 in arranged to produce regular rotation of a sprocket 36 fixed to the tubular outer sleeve 16. This motor is arranged for high-speed regular rotation of yoke 14 and the antenna 11 supported therein, e. g., at a speed of 1,200 revolutions per minute.

Another motor 37 is coupled through speed reduction gears 38, 39, 41 and 42 to a shaft 43 upon which are carried a large spur gear 44 and a small spur gear 46. The small-diameter gear 46 is shown meshed with a large gear 47 arranged integrally with a smaller gear 50. The unit including gears 47 and 50 is internally splined and slidably arranged on a splined shaft 48 for driving a crank pin 49. This pin 49 is coupled through a connecting rod 51 to one end of a lever arm 52. The lever arm 52 is coupled, by a pin 53 coacting in a slot thereof, to a collar 54 seated in a circumferential groove in the end of the inner member 18. The lever arm 52 is arranged to pivot about a fulcrum 56, so that rotation of the crank pin 49 causes reciprocal translatory movement of the upper end of the lever arm 52, and accordingly compels the collar 54 to impart reciprocal translation to the inner member 18 along the X—X axis.

The connecting pin between connecting rod 51 and the upper end of lever arm 52 is arranged to be guided in a longitudinal slot or groove parallel to the common axis of the outer sleeve 16 and the inner member 18 in a stationary guide member 134. A potentiometer 131 having a fixedly positioned stator 132 has a slider arm 133 fixed to the connecting pin which pivotally joins connecting rod 51 and the upper end of lever 52. This potentiometer may be electrically connected with a voltage source and arranged for supplying an output voltage varying precisely in accordance with the variation of the nod angle of antenna 12. Such a voltage is useful in cooperation with radar indicator apparatus or direction finder indicator apparatus, such as may be employed with the antenna 11.

A further directional reference voltage for an indicator may be provided by a generator 136 coupled through spur gears 137 and 138 to the shaft 32 and hence positively coupled to the outer tubular sleeve 16 for rotation therewith. The voltage variations determined by generator 136 and the potentiometer 131 may be applied in a well known manner to directional indicator arrangements, as for example, to the deflection circuits of a cathode ray object position indicator coupled to the output circuit of a radar receiver.

The use of generators and potentiometers coupled to a regularly moving directive antenna for producing synchronous sweep in an indicator is illustrated in British Patents 497,147, December 9, 1938, British Thomson-Houston Company, and 542,634, January 21, 1942, F. Rost et al.

An ultra high frequency energy transfer system extends through the member 18 for enabling energy to be transferred between the antenna 11 and a transmitter or a receiver, or a combination of a transmitter and receiver arranged for alternate employment of the antenna. This energy transfer system may include a wave guide 57 (Fig. 2) extending along the axis of the paraboloidal reflector 12 substantially to the focal point thereof. The rearmost part of wave guide 57 may be arranged for vertical polarization when the axis Y—Y is vertical; and the wave guide may be twisted through 90° between the rearmost point of reflector 12 and the focal region thereof, to provide for horizontal polarization in the focal region when axis Y—Y is vertical. If desired, a dipole unit 55 including one or more dipole elements extending through and supported by a vertical plate may be attached to the end of wave guide 57 at the focal region of reflector 12, the dipole elements being coupled to the wave guide 57 and being positioned substantially at the focus of the reflector 12.

Moreover, if desired, a further dipole element 60 may be attached to wave guide 57 in an elastic retaining mount arranged to hold it oriented parallel to the dipole elements of unit 55 during mere oscillation of antenna 11, but to be turned through 90° by centrifugal force, into a position of minimum interaction with the dipole elements of unit 55, when the antenna 11 is rapidly rotated. Such an arrangement of a wave guide, dipole unit and shiftable further dipole element is shown and discussed at greater length and claimed in copending U. S. application Serial No. 585,825 of John E. Karlson, filed March 31, 1945.

A coaxial line 56 having its inner conductor extending through wave guide 57 and its outer conductor ending in a junction with the wall thereof may be employed as a link to a further wave guide 58, joining wave guide 58 in a rotatable junction adjacent bearing 13. This junction is generally similar to the junction between coaxial transmission line 56 and wave guide 57, except that the inner and outer conductors of transmission line 56 are arranged to be rotated about their common axis (which is coincident with the Y—Y axis) relative to wave guide 58. Wave guide 58 is coupled at its opposite end to a hollow high frequency energy conductor 59 which may be a coaxial transmission line or a wave guide extending along the axis X—X of rotation of the antenna system. The hollow high frequency energy conductor 59 may be directly connected to wave guide 58, and hence may be mechanically fixed to the yoke 14. This conductor is then rotated along with the tubular outer sleeve 16 by the operation of the spinner motor 26. At its rearmost end, the hollow high frequency energy conductor 59 may be coupled by a further rotating joint to a stationary wave guide 61, through which energy is transferred to or from the associated radio circuits.

In accordance with one important feature of the present invention the operator is permitted to stop the high-speed rotation of the antenna about axis X—X by the spinner motor 26, and to lock the tubular outer sleeve 16 and the yoke 14 in a position for alignment of the Y—Y axis of the oscillation-permitting bearings 13 and 13' in a predetermined orientation, e. g., in a substantially vertical orientation. The oscillation of the antenna 11 produced by the operation of motor 37 is continued, so that the directive axis of the antenna 11 is made to sweep through a substantially horizontal and substantially planar zone. In order to facilitate the automatic locking of the rotatable system 11, 14, 16, 18, 32 with axis Y—Y in a predetermined alignment, a miniature motor 63 is coupled through a high-ratio speed-reduction gear train 64 and an over-drive clutch 66 to the worm 29. Electrical circuits illustrated in Fig. 4 and hereinafter described in further detail are provided for simultaneously de-energizing motor 26 and energizing the indexing motor 63 to provide extremely slow rotation of the antenna 11 about axis X—X.

A spring-opposed torque motor electric switch unit 67 or rotary relay is energized after a predetermined time interval following the de-energization of motor 26, and the relay 67 then exerts a torque tending to cause its rotor to be rotated through a predetermined angle, e. g. 30°, for actuation of its switch contact elements. The rotary relay unit 67 is coupled through a spur gear 68 and a sector gear 69 to a tooth 71 arranged to engage in a slot 72 in a cam 73 fixed on shaft 32. When the rotary relay 67 is energized, it depresses the tooth 71 against the cylindrical outer face of cam 73, until the axis Y—Y of bearings 13 and 13' arrives at a predetermined alignment, which preferably is an alignment parallel to the normally vertical axis of the craft in which the system is installed. When this alignment is reached, as indicated by the arrival of slot 72 directly beneath tooth 71, the rotary relay torque depresses the tooth 71 into the slot 72. Sufficient rotation of the relay rotor element is thereby permitted by the depression of tooth 71 to shift the rotary relay contactors and to de-energize the index motor 63 to which the rotary relay is electrically connected. The rotary relay unit 67 thereafter continues to apply sufficient torque to the sector gear 69 to hold the tooth 71 in engagement with slot 72, so that this tooth retains the antenna system accurately indexed and positively locked against rotation about the X—X axis.

When it is desired to return to the spiral scanning mode effected by simultaneous rotation of outer sleeve 16 and translation of the inner member 18, the rotary relay 67 is de-energized, so that the tooth 71 is immediately withdrawn from its locking position in the slot 72; and the spinner motor is energized, so that the rapid rotation of the antenna about the X—X axis is again provided.

In order to obtain still further flexibility of modes of operation of the scanning system, apparatus is provided for effecting simultaneous and correlated shifts in the angular range of oscillation of antenna 11 about axis Y—Y and in the period of the oscillation. When the angular range of oscillation is increased, the period of the oscillation is increased substantially proportionately; and when the angular range is decreased the period of oscillation is decreased substantially proportionately. In this way, the antenna may be oscillated at all times at the optimum speed consistent with the angular coverage provided thereby.

For this purpose, an angular range shifting motor 76 is coupled through a speed reduction gear train 77 to a shaft 78 upon which is provided a spur gear 79 meshing with a sector gear 81. Sector gear 81 controls the position of the fulcrum pin 56 about which the lever arm 52 operates. A helical cam 82 is also provided upon the shaft 78 for driving a cam follower 83 in translation parallel to the shaft 78 and also parallel to shaft 43 through which power is transmitted to the crank 49 to impart oscillation to the antenna 11. A fork 84 rigidly connected to cam follower 83 is arranged to shift the unitary pair of spur gears 47, 50 along the splined shaft 48.

When shaft 78 is in the position in which it is shown in Fig. 1, the fulcrum pin 56 is at the top of its travel, so that the ratio of the lever arms above and below the fulcrum pin is set for maximum travel of the inner member 18 and, accordingly, for maximum angular range of oscillation of the antenna 11. This maximum range of oscillation may be of the order of 130°. At the same time, the larger spur gear 47 of the gear pair 47, 50 meshes with the smaller gear 46 of the driving gears 44, 46, providing for long-period oscillation—e. g., for one oscillation cycle per 4 seconds. Upon clockwise rotation of the shaft 78 as viewed in Fig. 1, however, as produced by counter-clockwise operation of the shift motor 76, the fulcrum pin 56 is caused to move from the top to the bottom of the slot 60 in the lever arm 52, and accordingly, to reduce the range of travel of the member 18. As a result, the range of oscillation of antenna 11 is proportionately decreased, e. g., to an angular range of the order of 30°. At the same time, the fork 84 is moved toward the spur gear 79, taking the large-diameter gear 47 out of engagement with driving gear 46 and bringing gear 50 into engagement with driving gear 44, to provide a predeterminedly increased rate of rotation of shaft 48, and thus a shorter period of oscillation of antenna 11.

The diametral ratios of spur gears 46 and 47, and of the alternatively coupled gears 44 and 50, may be selected for changing the period of oscillation of the antenna 11 about the Y—Y axis substantially in proportion to the change of the angular range of oscillation. For example, the period of oscillation may be reduced from four seconds to one second when the angular range of oscillation is reduced from 130° to 30°.

A further cam follower 86 may be provided upon a further helical cam portion 87 of shaft 78 for operating a switch 88 which may be arranged as a limit stop and travel reversing switch. Switch 88 may be arranged to arrest motor 76 upon the completion of a nod angle shifting operation, and to preset suitable control circuits for subsequent operation of the motor 76 in the reverse direction to change the oscillation conditions in the opposite sense.

The electric circuit arrangements for this feature, as well as for the choice between spiral scan and oscillatory scan about a fixed axis, are shown in Fig. 4. An electric source 101, which may be an aircraft ignition supply battery, is grounded at one terminal to the craft framework and connected at its opposite terminal to a main scanner power switch 102. Through switch 102, power from source 101 is supplied to the nod motor 37, to circuits for determining the angular range and period of oscillation, and to further circuits arranged for either energizing the spin motor 26 to produce spiral scanning or de-energizing motor 26 and locking the antenna about the X—X axis for oscillation only about a substantially vertical Y—Y axis.

Switch 102 is connected at its output terminal directly to one terminal of motor 37, whose opposite terminal is grounded. Motor 37 with this connection is operated at all times when the main control switch is closed.

The output terminal of switch 102 is also connected to a scanning mode selector switch 103 connected in series with the coil of a scanning mode selector relay 104. When switch 103 is closed, the contact arm 106 of relay 104 completes an actuating circuit through a heavy duty relay 107, through which the antenna rotating motor 26 is then energized to provide rapid rotation of the antenna system about the X—X axis. While switch 103 is closed and relay 104 is energized, the contact arm 106 isolates the indexing circuits 108 from source 101, so that these circuits are prevented from interfering with the rapid rotation of the antenna system. When switch 103 is opened, the heavy duty relay 107 is de-energized, and accordingly, the spin motor 26 is turned off. The return of the contact arm 106 of relay 104 to its raised position energizes time delay relay 111 and the indexing motor 63. The indexing motor maintains the antenna 11 in rotation at an extremely low speed about the X—X axis, e. g., at a speed of one revolution per minute.

After a predetermined time interval for which the time delay relay 111 is preadjusted, the contacts of the time delay relay are closed, as by the action of heat produced by a resistance element 112 and gradually transferred to a bi-metallic contact arm 113, and the closing of this contact circuit applies the full voltage of source 101 to the main operating coil 114 of the rotary relay 67. This causes an appreciable torque to act upon the relay rotor 68, tending to cause rotation of the rotor and to carry the movable contact element 116 of the rotary relay 67 from its quiescent raised position, wherein it is connected through relay 104 and switch 102 to the high-potential terminal of source 101, downward to a position in which this movable element contacts a grounded contact terminal 117. The rotary relay torque motor is prevented from turning, however, until cam 73 rotates to the position at which it permits engagement of the cooperating elements 71 and 73 whereupon the relay rotor turns clockwise sufficiently to connect its movable contact element 116 to terminal 117, which is connected to ground. This de-energizes and short-circuits the rotor of indexing motor 63, and reduces the actuating current through the main torque coil 114 of the rotary relay 67, by the opening of the contact elements of the time delay relay 111 and the consequent connection of a high resistance holding coil 118 in series with coil 114 in the source voltage circuit. Holding coil 118 thereafter maintains the rotary relay rotor in its actuated position, until a further operation of relay 104 is executed for restoration of spiral scanning.

For changing back from substantially planar scanning to spiral scanning, the switch 103 is closed, de-energizing the entire indexing circuit 108 and releasing the elements 69, 71 from engagement with the cam 73, and energizing spin motor 26 to provide full speed rotation about the X—X axis.

Regardless of the type of scanning employed (i. e., whether the Y—Y axis is stationary or is rapidly rotated about the X—X axis), the operator of the scanning system is able by a simple switch operation to vary the angle through which the antenna is oscillated about the Y—Y axis. For this purpose, the shift motor 76 is arranged with its field coil 75 continuously energized in a fixed polarization during operation of the scanning system, and its rotor circuit is connected between the movable contact arms of a pair of relays 121 and 122. Normally, both of these relays are de-energized, so that no potential difference is applied to the shift motor rotor circuit. For example, with the circuit conditions illustrated in Fig. 4, the coil circuit of relay 121 is held open by switch element 128 and the coil circuit of relay 122 is held open by switch 126. In order to change the angular range of oscillation of the antenna 11, e. g., from narrow range to wide range, the operator need only throw the blade of the single pole, double throw switch 126 to the opposite position, e. g., to the right. This completes the circuit through the closed one 127 of the ganged switch elements of the cam-operated switch 88, energizing relay 122, and producing a resultant potential difference between the rotor terminals of motor 76. This motor then operates through a predetermined range of movement, sufficient to effect the shifting of gears 47 and 50 (Fig. 1) and of the reciprocating linkage fulcrum 56, whereupon switch element 127 of switch 88 is opened and the opposite switch element 128 thereof is simultaneously closed. The opening of switch element 127 de-energizes the relay 122 which was energized upon the throwing of switch 126, and the closing of switch 128 presets the circuit through relay 121 for actuation by a further operation of switch 126.

Thus, the oscillation range shift motor 76 is arranged to be energized only for a relatively brief period, sufficient to effect a shift of angular range and period of oscillation of the antenna, and to provide cam operation of the switch 88 arranged to limit the extent of movement of the shift system and to preset suitable circuits for a subsequent oscillation range shift in the opposite sense.

With the circuits shown in Fig. 4 in conjunction with the mechanical features of the present invention illustrated in Figs. 1–3, an operator is enabled to select any of four scanning conditions, as follows:

(1) Spiral scanning (switch 103 closed), with wide-range oscillation (the arm of switch 126 thrown to the right);

(2) Spiral scanning (switch 103 closed), with narrow-range oscillation (switch 126 thrown to the left);

(3) Substantially planar, wide-range oscillation (switch 103 open and switch 126 thrown to the right); and (4) Substantially planar, narrow-range oscillation (switch 103 open and switch 126 thrown to the left).

With any of the above four scanning conditions, the antenna is positively driven at the maximum speed consistent with long life and dependability of the mechanical elements. All motive power required for regularly varying the antenna aiming is transmitted through strong mechanical elements from fixedly mounted motors, so that no control circuits need be carried through moving parts of the scanner apparatus. Real flexibility of application is made available with substantially instantaneous changeability from any of the above four operating conditions to any other. The electrical efficiency of the system is very high, since the antenna rotation motor is energized only when spiral scanning is employed, and the oscillation producing motor is fully active in all modes of operation. The oscillation range and period shift motor and the indexing motor are very small, and neither of these motors is employed except during a change of the scanning conditions.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Periodically moving directive antenna apparatus for operation in wide-range or narrow-range oscillatory scan, comprising a directive antenna having an axis of directivity, bearing means for supporting said antenna for rotation about an axis transverse said axis of directivity, a motor, a crank, a variable-speed device coupling said motor to said crank, a lever pivoted on a movable fulcrum and coupled to said crank and also to said directive antenna, and means coupled to said variable-speed device and to said fulcrum for coordinately changing the speed of rotation of said crank and the relative lengths of lever arms of said crank and antenna couplings.

2. Periodically moving directive antenna apparatus for operating in wide-range or narrow-range oscillatory scan and for producing an electric variation cophasal with the oscillatory scan movement and of amplitude independent of the scan range, comprising a directive antenna having an axis of directivity, bearing means for supporting said antenna for rotation about an axis transverse said axis of directivity, a motor, a crank, a movable fulcrum, a lever pivoted on said movable fulcrum and coupled to said directive antenna for moving said antenna about said transverse axis, a connecting rod connected at one end to said crank, means constrained to movement along a predetermined path for coupling the opposite end of said connecting rod to said lever, whereby rotation of said motor moves said coupling means reciprocally through a predetermined constant range of movement and thereby produces oscillatory movement of said directive antenna through a range of movement dependent upon the position of said movable fulcrum, and electric signal control means coupled to said coupling means to be driven thereby, said signal control means comprising a two-part device responsive to relative movement between the two parts thereof for producing an electric signal variation directly dependent thereon.

3. Periodically moving directive antenna apparatus for operation in a selected scan range, comprising a directive antenna having an axis of directivity, bearing means supporting said antenna for rotation about an axis transverse said axis of directivity, a motor, variable-stroke mechanical energy transfer means adapted to be driven by said motor and coupled to said antenna for producing oscillation thereof about said transverse axis, means for controlling the rotational power applied to said energy transfer means, and means for varying the stroke of said energy transfer means in a predetermined relation to the applied rotational power, whereby the range of oscillation of said antenna is regulated in accordance with the control of the rotational power applied to said energy transfer means.

4. Periodically moving directive antenna apparatus for operation in wide-range or narrow-range oscillatory scan comprising a directive antenna having an axis of directivity, bearing means supporting said antenna for rotation about an axis transverse to said axis of directivity, a constant speed motor energized to provide continuous rotation only in one given direction, motion transmitting mechanism connected in driving relation to said antenna and in driven relation to said constant speed motor, said mechanism comprising means for changing the continuous rotary movement of said constant speed motor into reciprocating rotary movement whereby said axis of directivity is oscillated about said transverse axis through a given angle and at a given angular velocity, and means connected to said mechanism for concurrently changing the reciprocatory output thereof to an oscillation having both a different angle and a different angular velocity.

5. The antenna apparatus of claim 4 wherein the means for changing the continuous rotary movement of said constant speed motor into reciprocating rotary movement includes an eccentric connected to drive a link having a positionable fulcrum, and wherein the means connected to said mechanism for concurrently changing the reciprocatory output thereof to an oscillation having both a different angle and a different angular velocity includes means for positioning said positionable fulcrum to provide said different angle of oscillation.

6. Periodically moving directive antenna apparatus for operation in wide-range or narrow-range oscillatory scan comprising, a directive antenna having an axis of directivity, bearing means supporting said antenna for rotation about an axis transverse to said axis of directivity, a constant speed motor energized to provide continuous rotation only in one given direction, motion transmitting mechanism connected at the input end thereof to said motor and at the output end thereof to said antenna, said mechanism comprising means for converting the continuous rotation of said motor to a reciprocating angular movement for transmission to said antenna, means for varying the magnitude of said reciprocating movement from a first value to a second and different value and vice-versa, and means for changing the rate of said reciprocating movement concurrently with the variation of the magnitude thereof whereby the rate of said reciprocating movement for said first value of magnitude of said movement is different from the rate of movement for said second value of magnitude of movement.

7. Periodically moving directive antenna apparatus for operation in wide-range or narrow-range oscillatory scan comprising, a directive antenna having an axis of directivity, bearing means supporting said antenna for rotation about an axis transverse to said axis of directivity, a constant speed motor energized to provide continuous rotation only in one given direction, motion transmitting mechanism for changing the continuous rotary movement of said motor into reciprocating rotary movement of a given magnitude and angular velocity, said mechanism being connected in driving relation to said antenna and in driven relation to said motor, means connected to said mechanism for altering the magnitude of said reciprocating rotary movement to a different and greater value and means for substantially simultaneously altering the angular velocity of said movement to a lesser value whereby said antenna is noddable about said transverse axis with either of two combinations of angular magnitude and velocity of reciprocating rotary movement.

8. Periodically moving directive antenna apparatus for operation in wide-range or narrow-range oscillatory scan comprising, a directive antenna having an axis of directivity, bearing means supporting said antenna for rotation about an axis transverse said axis of directivity, a first motor energized to provide constant speed and uni-directional rotation, motion transmitting means connected between said first motor and said antenna, means for deriving from said first motor a reciprocatory rotary movement of variable magnitude and rate, a second motor, means reversibly to energize said second motor, means connected to said second motor to vary the magnitude and rate of said reciprocatory movement from one pair of values to another pair of values upon reversal of said second motor, and means to limit the operation of said second motor to a predetermined amount in either direction of drive, whereby said antenna may be caused to nod through one or the other of two different nod angles and at one or the other of two different angular velocities by energizing said second motor to drive in one direction or the other for said predetermined amount of operation while said first motor continues to rotate in a given direction.

STANLEY L. BERGEY.
JAMES A. NOTTINGHAM.

References Cited in the file of this patent
UNITED STATES PATENTS

| Number | Name | Date |
|---|---|---|
| 737,541 | Williams | Aug. 25, 1903 |
| 2,271,795 | Demarest et al. | Feb. 3, 1942 |
| 2,407,310 | Lundy et al. | Sept. 10, 1946 |
| 2,415,678 | Edwards | Feb. 11, 1947 |
| 2,518,511 | White et al. | Aug. 15, 1950 |